US012593910B2

(12) United States Patent
John et al.

(10) Patent No.: US 12,593,910 B2
(45) Date of Patent: Apr. 7, 2026

(54) METHOD OF MANUFACTURING A MOUTHPIECE TOOTHBRUSH AND MOUTHPIECE TOOTHBRUSH

(71) Applicant: Ivoclar Vivadent AG, Schaan (LI)

(72) Inventors: Hendrik John, Buchs (CH); Christian Niedrig, Azmoos (CH); Theresa Sujata Maria Senti, Triesenberg (LI); Martina Hauner-Westphal, Feldkirch (AT); Tatiana Glebova, Buchs (CH)

(73) Assignee: Ivoclar Vivadent AG, Schaan (LI)

( * ) Notice: Subject to any disclaimer, the term of this patent is extended or adjusted under 35 U.S.C. 154(b) by 823 days.

(21) Appl. No.: 17/711,520

(22) Filed: Apr. 1, 2022

(65) Prior Publication Data

US 2022/0322817 A1      Oct. 13, 2022

(30) Foreign Application Priority Data

Apr. 8, 2021      (EP) .................................... 21167317

(51) Int. Cl.
| | |
|---|---|
| *A46B 9/04* | (2006.01) |
| *A46B 13/02* | (2006.01) |
| *A61C 7/08* | (2006.01) |
| *A61C 17/34* | (2006.01) |
| *A61C 17/02* | (2006.01) |

(52) U.S. Cl.
CPC ............ *A46B 9/045* (2013.01); *A46B 13/023* (2013.01); *A61C 7/08* (2013.01); *A61C 17/3481* (2013.01); *A61C 17/0208* (2013.01)

(58) Field of Classification Search
None
See application file for complete search history.

(56) References Cited

U.S. PATENT DOCUMENTS

| | | | |
|---|---|---|---|
| 5,653,591 | A | 8/1997 | Loge |
| 5,974,615 | A | 11/1999 | Schwarz-Hartmann et al. |
| 7,921,496 | B2 | 4/2011 | Choi |
| 8,499,851 | B2 | 8/2013 | Hata |
| 8,745,802 | B2 | 6/2014 | Steur |
| 9,907,633 | B2 | 3/2018 | Wolpo |
| 10,022,209 | B2 | 7/2018 | Lee |

(Continued)

FOREIGN PATENT DOCUMENTS

| | | |
|---|---|---|
| DE | 1035096 B | 7/1958 |
| EP | 3366261 A1 | 8/2018 |

(Continued)

OTHER PUBLICATIONS

Machine Translation EP3366261.*

*Primary Examiner* — Christopher T Schatz
(74) *Attorney, Agent, or Firm* — Ann M. Knab; Thad McMurray

(57)      ABSTRACT

A method for producing a mouthpiece toothbrush is provided, in which at least one dental arch of the patient for whom the toothbrush is intended is scanned to generate scan data, or an impression of the dental arch is made. Based on the scan data or the then digitised impression, the dental arch space occupied by the dental arch is recorded. A bristle space is constructed around the at least one dental arch, and a toothbrush moulded piece is calculated, the surface of which facing the dental arch is determined by the dental arch space plus the bristle space. The surface is covered with a bristle carpet.

15 Claims, 3 Drawing Sheets

(56) References Cited

U.S. PATENT DOCUMENTS

| | | | |
|---|---|---|---|
| 10,758,327 B2 | 9/2020 | Katano et al. | |
| 10,772,713 B2 | 9/2020 | Sohn | |
| 11,254,084 B2 | 2/2022 | Kunz et al. | |
| 2014/0137354 A1* | 5/2014 | Newman | A46B 9/04 |
| | | | 264/541 |

FOREIGN PATENT DOCUMENTS

| | | | |
|---|---|---|---|
| KR | 101781631 B1 | 9/2017 | |
| WO | 2007121760 A1 | 11/2007 | |

* cited by examiner

METHOD OF MANUFACTURING A MOUTHPIECE TOOTHBRUSH AND MOUTHPIECE TOOTHBRUSH

CROSS-REFERENCE TO RELATED APPLICATIONS

This application claims priority to European Patent Application No. 21167317.3 filed on Apr. 8, 2021, the disclosure of which is incorporated herein by reference in its entirety.

TECHNICAL FIELD

The invention relates to a method for manufacturing a mouthpiece toothbrush, as well as a mouthpiece toothbrush.

BACKGROUND

Toothbrushes with a curved, parabolic shape, for use in the mouth of a user, have been known for a long time. Such toothbrushes have a shape corresponding to the user's dental arch. They are also called mouthpiece toothbrushes and are intended to lie with their bristles against the patient's dental arch, if possible both on the oral and vestibular sides, and to exert their cleaning action there. Dental arch should be understood broadly and includes not only a complete arcus dentalis but also partial regions thereof. The term applies equally to tooth arrangement as such, as well as to the tooth-bearing structures (with or without teeth).

An older example of such a toothbrush is known from DE 10 35 096 B. This toothbrush is suitable for manual operation. US 20150072300 and corresponding U.S. Pat. No. 9,907,633B2 are directed to an oral care system with a mouthpiece and are hereby incorporated by reference in their entirety. U.S. Pat. Nos. 11,254,084, 10,772,713, 10,758,327, 10,022,209, 8,499,851, 7,921,496, 5,974,615 and 5,653,591 are directed to electric or mechanical toothbrushes and are hereby incorporated by reference in their entirety.

An example of an electrically driven mouthpiece toothbrush can be found in EP 2 384 160 A1 and corresponding U.S. Pat. No. 8,745,802B2, which US patent is hereby incorporated by reference in its entirety.

One problem with toothbrushes of this type is that the bristles have to extend from a comparatively complicated moulded piece. This also comprises inner corners and is therefore comparatively difficult to clean.

For this reason, it has been suggested that the moulded piece with the bristles be designed to be detachable from the drive unit. The mouthpiece should then be cleaned with a sharp jet of water. This solution ensures satisfactory hygienic conditions.

Nevertheless, the mouthpiece toothbrush has not become established. The main reason is that the cleaning effect was judged very differently. In dental circles, this was mainly attributed to different brushing behaviour, different care of individual users and the suboptimal design and stimulation of the bristles.

SUMMARY

Therefore, the invention is based on the task of creating a method for manufacturing a mouthpiece toothbrush as well as a mouthpiece toothbrush according to the claims, in which a consistently good cleaning effect is ensured. Advantageous further embodiments result from the sub-claims.

According to the invention, it is intended to manufacture the mouthpiece toothbrush in a patient-specific manner. This ensures that a perfect fit and cleaning effect is achieved in all cases. In this respect, particular advantage can be taken of the fact that the toothbrush according to the invention comprises, in cross-section, a U-shaped channel, which is lined with bristles and those bristles and, in particular, bristle tips are adapted to the user.

The spacing of the opposing bristle tips, i.e., the oral (i.e., the palatal and lingual side of the tooth; towards the oral cavity) and vestibular (i.e., the side of the tooth adjacent the cheeks and lips) facing bristle tips on the one hand and the vestibular and oral facing bristle tips on the other hand, is also adapted to the specific patient in such a way that the bristles with their bristle tips are distributed as evenly as possible over the tooth surfaces and can penetrate in particular into the interdental spaces which are particularly sensitive to soiling, food particles, and the like.

The bristle tip distance is therefore less than the vestibular-oral width of the user's teeth.

The special arrangement according to the invention thus results in a predetermined and user-independent brushing pressure of the bristles.

In addition, an external translatory and/or rotatory drive achieves a cleaning effect that is independent of the handling by the individual user, resulting in a consistently good cleaning result for all users. This is particularly useful for elderly or disabled people who are no longer able to brush their teeth independently.

According to the invention, the patient's mouth is scanned for the production of such a mouthpiece toothbrush. Alternatively, it is also possible to take an impression and scan it in a manner known per se. This provides scan data of the patient's mouth.

Based on this, a bristle space of essentially constant thickness is constructed around the dental arch. The designed bristle space thus corresponds to a virtual oversize when designing the moulded piece of the mouthpiece toothbrush based on the scan data.

The toothbrush moulded piece is calculated on the basis of this construction result or calculation result. The surface of the toothbrush moulded piece facing the dental arch is covered with a bristle carpet after or during the manufacture of the moulded piece. According to the invention, the bristle carpet is standard material, and yet the customisation of the moulded piece results in a toothbrush that is easy to manufacture and therefore inexpensive, while being adapted to the individual user.

The thickness of the virtual bristle space is designed to provide the desired cleaning pressure. The thickness is accordingly designed to be greater than a clear width between the tooth arch or dental arch and the moulded piece.

By setting the difference between the actual thickness of the bristle carpet and the virtual thickness of the bristle space as specified by the manufacturer, the cleaning pressure can be adjusted. The greater the difference, the greater the cleaning pressure.

A particularly favourable advantage according to the invention results from implementing the bristle carpet as a standard product: the bristle carpet can be interchangeably mounted on the moulded piece. Such a mounting can be achieved, for example, by gluing, or by form-fitting mounting, corresponding to toothbrushes known per se with a replaceable brush head. When adapting the standardised bristle carpet, it is advantageous if the bristle carpet can be elastically or plastically deformed so that it can adapt to the cavity/inside of the individualised moulded piece.

The interchangeability of the bristle carpet can further improve oral hygiene.

In an advantageous further development according to the invention, it is provided that channels are formed in the moulded piece and the bristle base of the bristle carpet. These are connected to a source of rinsing liquid, which introduces rinsing liquid into the channels and supplies it to the tooth surface.

The source can, for example, be a high pressure source like that of a commercially available oral irrigator. Preferably, the rinsing liquid is supplied under considerable over-pressure or high pressure, e.g., 1 to 8 bars, and is pulsed, e.g., 30 to 2000 water pulses per minute.

It is particularly advantageous if the channels pass through both the moulded piece and the bristle carpet and, in particular, if they end in the bristle carpet at the base of the carpet, namely between the bristles.

Preferably, channels for the rinsing fluid are provided both in the vestibular area and in the oral area of the moulded piece. This makes it possible to provide negative pressure on one side of the dental arch and positive pressure on the other side, thus ensuring flushing.

Preferably, the oral-vestibular channels end at the side of the moulded piece facing away from the dental arch at a flushing line that extends medial-distally. One flushing line then runs on the oral side and another on the vestibular side, and one is under positive pressure and one under negative pressure.

It is also possible to change the flushing direction, as necessary, by exchanging the connection of the positive pressure source with the negative pressure source.

For example, the bristle carpet provided as a standard product may comprise several comparatively small holes in the carpet base. The channels in the moulded piece can have a larger cross-section compared to the holes, for example also in such a way that one channel supplies one hole or also several holes with flushing liquid.

In this embodiment, it is not necessary to subsequently adapt the holes in the carpet base to the channels in the moulded piece.

Alternatively, it is also possible to produce both the bristle carpet and the moulded piece free of channels. In this embodiment, the desired number of holes and channels can then be created in one perforation step. Preferably, the perforation is then carried out from the side of the bristle carpet, i.e., from the cavity of the moulded piece.

For the production of the mouthpiece according to the invention, the process of injection moulding can be used, for example. The injection mould is customised, based on the scan data, for example by milling or by an additive manufacturing process, i.e., additive manufacturing or 3-D printing.

The bristle carpet, which is available as a standard product, is then applied and fixed to the surface of the moulded piece facing the dental arch. This can be done, for example, using a biocompatible adhesive.

It is also possible to connect the bristle carpet to the moulded piece in a detachable and reattachable manner. In this embodiment, the bristle carpet is particularly easy for the user to clean.

In both of the above cases, the bristle carpet adapts to the free-form surface of the moulded piece facing the dental arch due to its elasticity or plasticity.

In another embodiment, the bristle carpet is placed in the injection mould and the moulded piece is injected at the base of the carpet. This solution enables a particularly good adhesion between the bristle carpet and the moulded piece.

The choice of material for the moulded piece and the bristle carpet can be adapted to the requirements in a wide range. Preferably, the moulded piece is made of for example, but not limited to a stiff plastic material such as polypropylene, polymethyl methacrylate (PMMA), polyethylene terephthalate (PET), acrylonitrile-butadiene-styrene, styrene-acrylonitrile, and polypropylene and similar materials known to one of skill in the art, and the bristle carpet is made of an elastomer, such as for example, but not limited to, a medical silicone, thermoplastic polyurethane (TPE), thermoplastic polyurethane (TPU), and rubber, nylon, and similar materials known to one of skill in the art whereby different degrees of hardness within the bristle carpet are also possible and the bristle carpet can be realised by vacuum casting or injection moulding.

After application to the moulded piece, the protruding bristle carpet is cut off without further ado.

The bristle carpet itself can be manufactured in one piece. Alternatively, it is also possible to embed the bristles in a somewhat softer carpet base in a manner known per se. For example, the bristles can be over-moulded for this purpose.

It is also possible to first model the mouthpiece virtually in a CAD software and to provide the inside of the cavity of the moulded piece intended for the dental arch with a bristle-like texture. The production is preferably carried out via additive manufacturing and enables the individualised mouthpiece toothbrush to be mass-produced in one piece.

Alternatively, it is also possible to realise a one-piece production in another way. In this embodiment, the moulded piece can also be made of elastomer and preferably has a dimensionally stable insert made of metal or hard or stiff plastic such as a plastic in the examples set for above, which provides the required dimensional stability.

The dimensional stability of the moulded piece is necessary to transmit the desired vibrations to the bristles. A vibration generator is firmly connected to the moulded piece in a manner known per se, but preferably in such a way that the connection is detachable.

The vibration generator sets the mouthpiece into translatory and/or rotatory movements.

This movement produces cleaning according to the invention, with the desired contact pressure of the bristles on the tooth surface, the so-called cleaning pressure, which is the same from patient to patient.

Preferably, the moulded piece covers the entire dental arch and thus has an essentially parabolic shape. In cross-section, the moulded piece is U-shaped in this embodiment, whereby the dental arch is inside the U, inside the cavity, and is cleaned there.

Alternatively, it is possible to make the mouthpiece H-shaped in cross-section. The upper dental arch is then received in the upper U of the mouthpiece, i.e., the upper cavity of the moulded piece, and the lower dental arch is received in the lower U of the mouthpiece, i.e., the lower cavity of the moulded piece.

Preferably, the bristle carpet and the moulded piece protrude beyond the area of the teeth in the direction of the cervical/apical/subgingival and thus cover part of the gingiva.

It is known that the gingival margin is particularly critical to clean, so that a special cleaning effect with an intensive cleaning area is provided there according to the invention. This can be achieved, for example, by increasing the contact pressure and/or by increasing the number of bristles per square millimetre.

In a further embodiment, it is provided that individual scan data are used for the production of an individual bristle carpet, and this is produced in particular directly by additive manufacturing and then inserted into the toothbrush moulded piece or a moulded piece for the individual bristle carpet is produced by additive manufacturing.

In this solution, it is also possible that the individually produced toothbrush moulded piece and the individually produced bristle carpet are 3D printed together in one step, in particular in a multi-component printing process, and the toothbrush moulded piece and bristle carpet are produced with different mechanical properties, in particular the moulded piece is produced from a harder material than the bristle carpet.

In a preferred embodiment, a method for manufacturing a mouthpiece toothbrush includes scanning at least one dental arch or an impression of the dental arch of a patient for whom the toothbrush is intended to generate scan data, based on the scan data, detecting or determining the dental arch space occupied by the dental arch, constructing a bristle space, in particular of constant thickness or substantially constant thickness, around the at least one dental arch, calculating a size and shape of a toothbrush moulded piece having a surface facing the dental arch determined by the dental arch space and the bristle space, and covering the surface of the moulded piece with a bristle carpet.

It is preferred that the toothbrush moulded piece is customized for each patient and the bristle carpet is a generic or not customized or standard with respect to bristle length, bristle thickness, bristle orientation and/or bristle base.

It is preferred that the dental arch space includes an area of the patient's teeth and adjacent gingiva, and the bristle space extends beyond the teeth towards the gingiva, labially, buccally and orally.

It is preferred that the bristle space extends over a region of the teeth and exclusively occlusally/incisally of the gingival region.

It is preferred that the bristle carpet includes a bristle base in which bristles are anchored, and/or the bristle base and bristles of the bristle carpet are formed in a single piece, where the bristles are configured to face the dental arch when the mouthpiece toothbrush is in position.

It is preferred that the bristles of the bristle carpet extend through the bristle space and abut a tooth arch space, and project into the tooth arch space by a predetermined amount in a range of 0.05 mm to 0.5 mm.

It is preferred that the bristle space has a substantially equal thickness over a longitudinal extension of a surface in a range of 1.5 mm to 4 mm, a range of 2 to 3 mm or equal to or about equal to 2.5 mm.

It is preferred that the bristle carpet fills the bristle space and has a plurality of bristles which are mounted in the bristle base oriented perpendicularly or substantially perpendicularly to a tooth surface.

It is preferred that the bristle carpet has a plurality of distributed bristles, the bristle carpet having a gingival portion extending obliquely to the surface facing the dental arch in the gingival direction, and an occlusal/incisal portion extending obliquely to the surface facing the dental arch in the occlusal/incisal direction.

It is preferred that the toothbrush moulded piece projects in the region of the gingival margin in the direction of teeth, forming an intensive cleaning region, and gingival margin bristles extend from the intensive cleaning region both in the direction of the teeth and in the direction of gingiva, in particular condensed compared to other regions.

It is preferred that the toothbrush moulded piece is produced by 3D printing and the bristle carpet is applied to an occlusal inner surface of the toothbrush moulded piece with a biocompatible adhesive.

It is preferred that the bristle carpet is interchangeably mounted on or in the toothbrush moulded piece.

It is preferred that the toothbrush moulded piece has the shape of a double T-beam in cross-sectional view and is configured for simultaneous application to the patient's upper jaw and lower jaw.

It is preferred that the at least one channel passes through the toothbrush moulded piece, with which the bristle carpet is placed under negative pressure in order to fix the bristle carpet by negative pressure.

It is preferred that an individualised small series of toothbrush moulds and then an individualised small series of mouthpiece toothbrushes is produced based on a plurality of mutually similar scan data.

It is preferred that a method of manufacturing a mouthpiece toothbrush includes scanning and digitizing at least one dental arch or an impression of the dental arch of a patient for whom the toothbrush is intended to generate scan data, detecting tooth arch space occupied by the dental arch, constructing a bristle space of constant or substantially constant thickness around the at least one dental arch, and calculating a toothbrush moulded piece size and shape having an area facing the tooth arch determined by the tooth arch space and the bristle space, and filling the bristle space with a standardised or individually manufactured bristle carpet.

It is preferred that the toothbrush moulded piece together with the bristle carpet is manufactured in one piece by additive manufacturing and the toothbrush moulded piece and the bristle carpet are manufactured from multiple materials with different degrees of hardness or stiffness.

It is preferred that an injection mould or a vacuum casting mould is produced based on the scan data and the bristle carpet is also modelled in the data set as a negative mould using CAD software, and the mouthpiece toothbrush is produced by injection moulding or by vacuum casting based thereon.

In a preferred embodiment, a mouthpiece toothbrush includes a toothbrush moulded piece and a bristle carpet connected to the toothbrush moulded piece, wherein the toothbrush moulded piece is produced with scan data using additive manufacturing, and wherein the bristle carpet is applied or attached to the toothbrush moulded piece on the inside, at or adjacent to an inner cavity of the moulded piece.

it is preferred that a plurality of channels are formed on both an oral side and a vestibular side of the bristle space in the toothbrush moulded piece, a rinsing medium, such as water, of an oral irrigator is introduced into a first part of the channels and is discharged from a second part, the toothbrush moulded piece has a plurality of internally formed channels, extending through the moulded piece from the vestibular to the oral side, which end on the oral side and/or on the vestibular side of the bristle carpet, and outlet openings of which are arranged at the respective interdental spaces close to the gingiva.

It is preferred that the moulded piece has, on the vestibular side of the channels, an adapter for connection to an oral rinsing device, with which a rinsing agent can be pumped into the internal channels of the toothbrush moulded piece for cleaning the interdental spaces.

It is preferred that the mouthpiece toothbrush is connected or connectable to a drive having a vibration generator, with which the mouthpiece toothbrush can be subjected to translatory and/or rotatory vibrations in a plurality of spatial axes, the vibration generator connected to a current sensor, with which its current consumption can be measured and sig-
nalled, which current consumption signals the cleaning
resistance.

BRIEF DESCRIPTION OF THE DRAWINGS

Further advantages, details and features will be apparent
from the following description of several embodiments of
the invention with reference to the drawings wherein.

DETAILED DESCRIPTION

Figure 1:
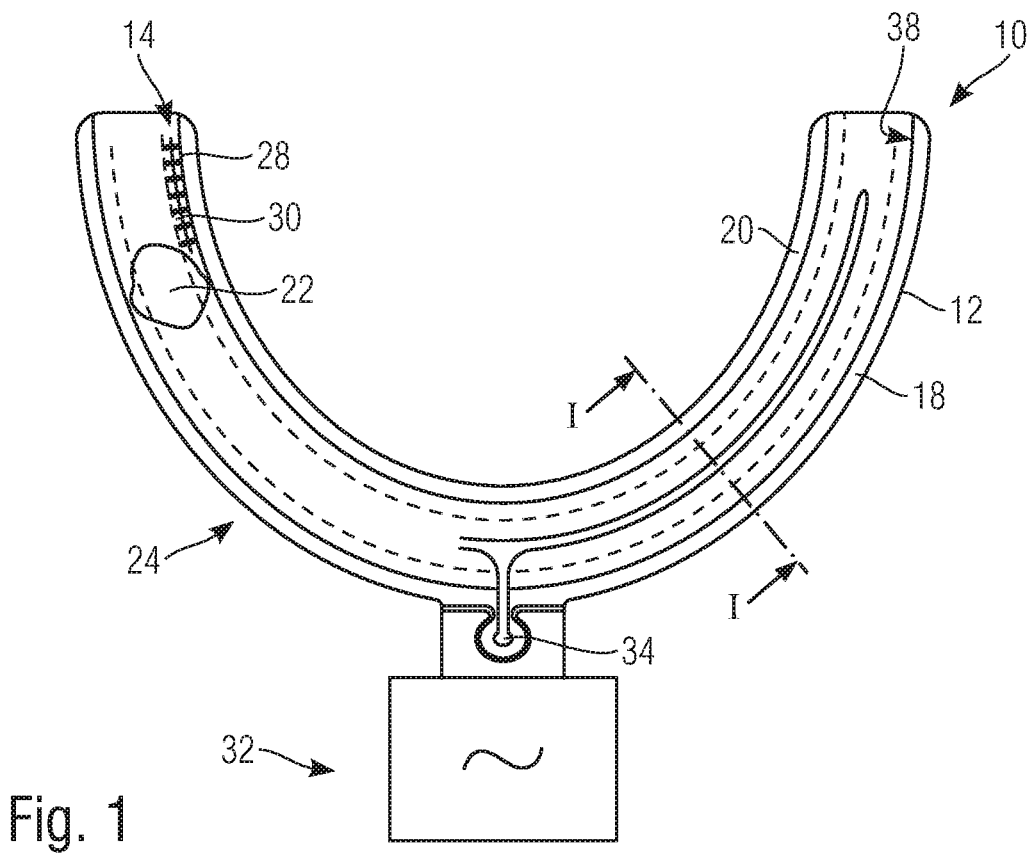
FIG. 1 is a schematic top view of a mouthpiece toothbrush
according to the invention in a first embodiment.

FIG. 1 shows a top view of an embodiment of a mouth-
piece toothbrush 10 according to the invention in a sche-
matic representation.

The mouthpiece toothbrush 10 has a moulded piece 12
and a bristle carpet 14. The moulded piece 12 is designed to
receive a human dental arch, not shown. For this purpose, a
cavity 16 is provided which can also be seen in FIG. 2 and
is U-shaped in cross-section.

The cavity 16 runs essentially parabolically between a
vestibular side wall 18 and an oral side wall 20. A tooth 22,
namely a molar, is shown schematically in FIG. 1. Tooth 22
has a slightly smaller width in the oral-vestibular direction
than the clear width between side walls 18 and 20.

The space in between is occupied by the bristle carpet 14
according to the invention. The bristle carpet 14 completely
lines the cavity 16, thus lies against the side walls 18 and 20
and also against the bottom wall 26 of the cavity 16.

The bristle carpet 14 comprises a carpet base 28 and a
plurality of bristles 30. In the illustrated embodiment, the
bristles 30 and the carpet base 28 are integral and are made
of biocompatible and medical grade silicone.

The bristle carpet 14 is made by vacuum moulding.
Different hardnesses or stiffnesses of the elastic bristle
carpet 14 are also possible, which are adapted to the require-
ments and can be used as needed.

In the embodiment shown, the bristle carpet 14 is bonded
to the moulded piece 12 with a biocompatible adhesive. It is
removable for cleaning purposes and can be stuck on again.

The bristle carpet 14 is thicker than the difference between
the width of the cavity 16 and the width of the tooth 22, so
that it is pressed against the tooth 22 on the oral side as well
as on the vestibular side and accordingly also against the
other teeth of the dental arch.

In this way, the toothbrush 10 develops a cleaning effect
during a relative movement between the dental arch and the
mouthpiece 24.

The magnitude of the contact pressure corresponds to the
amount by which the bristle carpet 14 is thicker than the
above difference. The cleaning pressure is approximately
equal on the oral and gingival sides of the dental arch.

The mouthpiece 24 is self-centring on the dental arch.

In addition to the mouthpiece 24, the mouthpiece tooth-
brush 10 also includes a vibration generator 32.

The vibration generator 32 is mounted in the incisal
region of the moulded piece 12 and is form-fitting. The
vibration generator causes the mouthpiece 24 to vibrate in
translation and/or rotation. A coupling 34 allows the vibra-
tion generator 32 to be mounted in a form-fitting manner, but
still be removable from the moulded piece 12, which ben-
efits the easier cleaning of the mouthpiece 24.

According to the invention, the bristle carpet 14 is pro-
vided as standard material with a constant thickness. In
contrast, the moulded piece 12 is individually adapted to the
user. For manufacturing, the user's mouth is first scanned
three-dimensionally. The scan data is used for the production
of the moulded piece 12.

Here, the bristle carpet 14, whose thickness is known per
se, is included, but only partially. Its thickness is assumed to
be less than it actually is for the virtual creation of the
moulded piece 12.

In the illustrated embodiment example, the thickness of
the carpet base 28 is 1 mm and the length of the bristles 30
is 1.5 mm. In this respect, the bristle carpet 14 actually has
a thickness of 2.5 mm.

Virtually, only a gap of 1.5 mm is left where it comes to
rest.

The surface 38 facing the dental arch and the cavity is
covered with the bristle carpet 14. As a result, the mouth-
piece 24 has an "oversize" of 0.1 mm towards the dental arch
at the cavity 16.

It is also possible to select any other suitable oversize,
e.g., 0.15 mm to 0.5 mm.

Thus, when using the toothbrush 10 according to the
invention, a cleaning pressure is exerted on the teeth which
benefits better cleaning.

Figure 2:
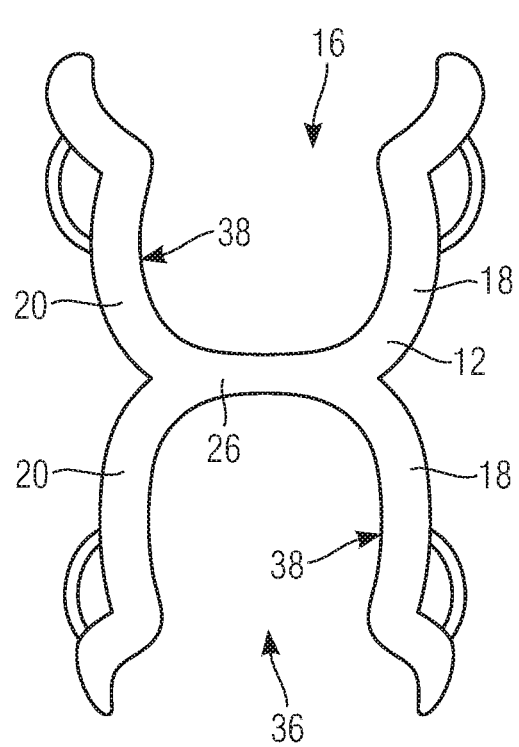
FIG. 2 is a sectional view of an embodiment of a
mouthpiece toothbrush at line I-I of FIG. 1 according to the
invention.

FIG. 2 shows a section along the line I-I from FIG. 1. The
same reference signs indicate identical or corresponding
parts here as well as in the further figures.

In this embodiment, the mouthpiece 24 of the toothbrush
10 is substantially double-T-shaped or H-shaped. In FIG. 2,
only the moulded piece 12 is shown that is actually covered
with the bristle carpet 14.

The moulded piece 12 has a maxillary cavity 16 for
receiving the maxillary dental arch, and a mandibular cavity
36 for receiving the mandibular dental arch. Between these,
the common connecting element 26 extends between the
upper and lower part as a common wall of both cavities 16
and 36.

The cleaning pressure between the occlusal surfaces of
the teeth and the bristle carpet 14, which covers the base wall
26, is adjusted by the occlusal pressure or chewing pressure
of the user.

This is the only pressure over which the user has any
influence.

In an advantageous embodiment of the invention, the
vibration generator 32 comprises a current sensor. If the
current sensor detects that the plaster resistance is too low,
i.e., the current consumption is too low, a signal is emitted
"Increase chewing pressure". Conversely, if the current
consumption is too high, it means that the user is biting too
hard. In this case, a "reduce chewing pressure" signal is
emitted.

This ensures that the mouthpiece toothbrush 10 according
to the invention always operates in a favourable range of the
cleaning pressure.

Figure 3:
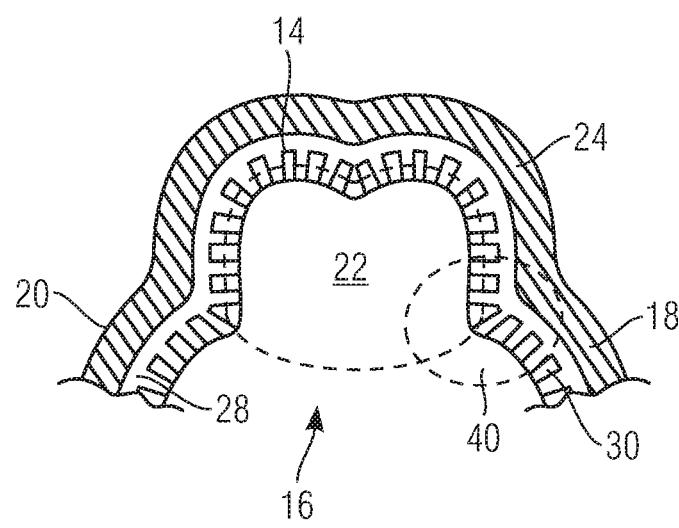
FIG. 3 is a section through a further embodiment of a
mouthpiece toothbrush according to the invention.

FIG. 3 shows a further embodiment of a mouthpiece
toothbrush 10 according to the invention in section through
the mouthpiece 24.

As can be seen, the section of the moulded piece 10 is adapted to the section of the dental arch. The moulded piece 10 extends not only over the tooth 22, but in the cervical direction beyond it. The moulded piece 10 covers the part of the gingiva close to the tooth.

An intensive cleaning area 40 is provided in the area of the gingival margin. The constriction there is greater than is the case with a human gingival margin.

Due to the greater constriction, the cleaning pressure there is also greater than in the rest of the area.

In contrast, the moulded piece 10 is more recessed at the gingiva itself, so that the plaster pressure is lowest there. This design is gentle on the user's gums.

Figure 4:
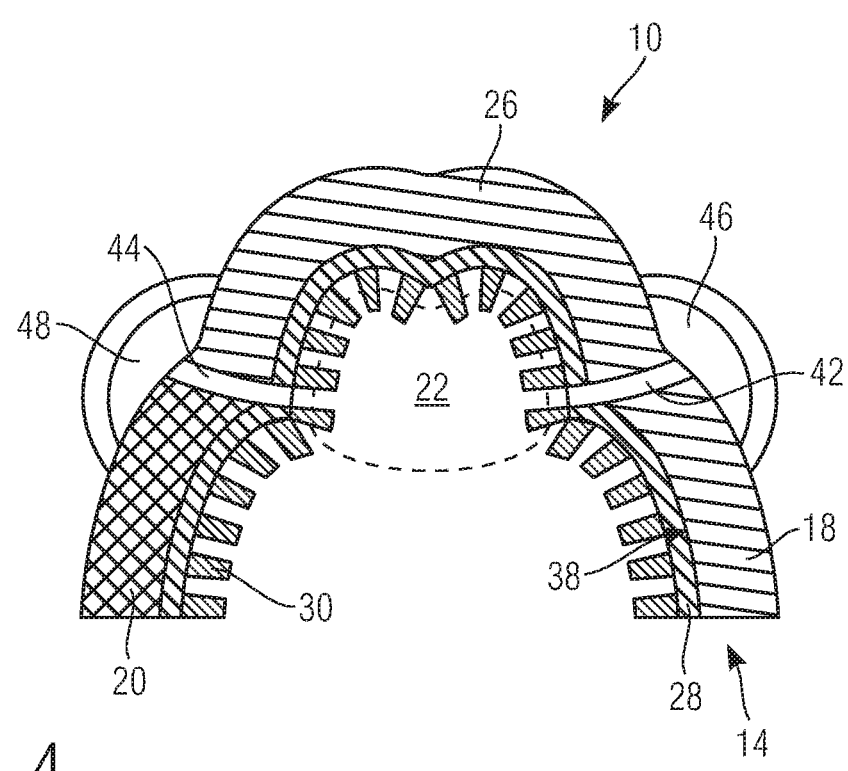
FIG. 4 is a sectional view of a further embodiment of a
mouthpiece toothbrush according to the invention.

A further embodiment of a mouthpiece 24 according to the invention is shown in FIG. 4. In this embodiment, channels 42 and 44 are provided which pass through the side walls 18 and 20 of the moulded piece 10. Additionally, they also pass through the bristle carpet 14, namely the carpet base 28, or the bristle carpet and carpet base have recesses at the corresponding outlet openings of the channels.

They open out on the dental side between bristles 30. On the outside, i.e., the vestibular side of the vestibular side wall 18 and the oral side of the oral side wall 20, there are irrigation lines 46 and 48, into which channels 42 and 44 open out.

The flushing lines 46 and 48 run mesial-distal and start from the area of the coupling 34. One line of these flushing lines 46 and 48 is connected to a positive pressure source and the other to a negative pressure source.

This provides an additional rinsing effect for food residues and plaque on the user's teeth in the manner of an oral shower. The combination of under-pressure and over-pressure provides a flow through the interdental spaces, which are particularly susceptible to contamination.

The rinsing direction can also be reversed, if necessary, simply by swapping the connection of the positive pressure source with that of the negative pressure source.

The tooth 22 is shown schematically and dashed in FIG. 4. As can be seen, its dimensions are larger than the clearance formed by the bristle tips of the bristles 30. The bristles 30 are guided by the rotational and translational movement of the mouthpiece 24 along the surface of the tooth and brush the tooth 22.

This also applies to a lesser extent to the gingival area, where the overlap between the bristle tips and the gum is less than for the tooth 22. In the embodiment example shown, the moulded piece 10 has a thickness of 3 mm and the bristle carpet 14 has a thickness of 2.5 millimetres. It is understood that these dimensions are adaptable to the requirements within wide ranges.

Figure 5:
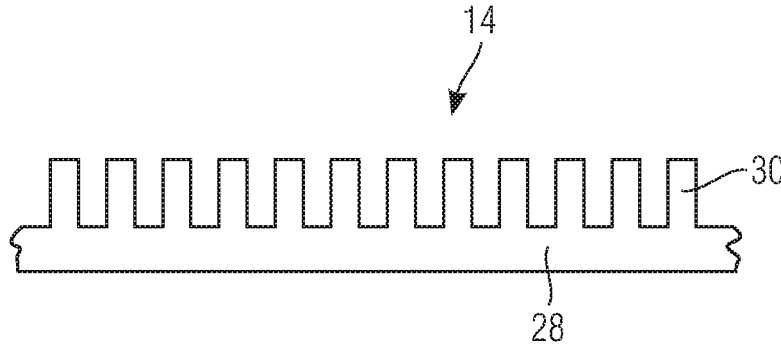
FIG. 5 is a section through a bristle carpet according to the
invention.

FIG. 5 shows a schematic section through a bristle carpet 14. In this embodiment, the bristles 30 are cylindrical. It goes without saying that the exact shape can also be adapted to the requirements across a wide range. Conical designs of the bristles are also possible, to give just one example. In this embodiment, bristles 30 and carpet base 28 are one piece. Instead, it is also possible to overmould the bristles in a manner known per se in order to produce the bristle carpet 14 in that way.

Figure 6:
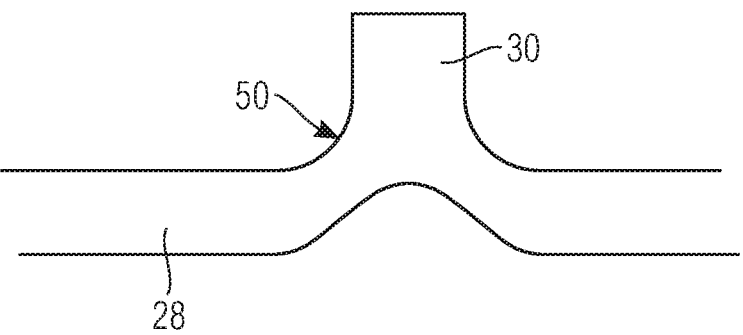
FIG. 6 is an enlarged view of a detail of the bristle carpet
according to FIG. 5.

FIG. 6 shows a possible design of the transition between the bristles 30 and the carpet base 28. The bristles undergo shearing stress. In order to reduce the notch effect at the transition, the transition is rounded, in particular with a radius 50.

The terms "about" and "substantially" are intended to include the degree of error or uncertainty associated with measurement of the particular quantity or shape as one of ordinary skill in the art would understand.

The scope of protection of the present invention is given by the claims and is not limited by the features explained in the description or shown to the figures.

The invention claimed is:

1. A method for manufacturing a mouthpiece toothbrush comprising scanning at least one dental arch or an impression of the dental arch of a patient to generate scan data, wherein the dental arch includes teeth and gingiva, based on the scan data, detecting a dental arch space occupied by the dental arch, constructing a bristle space, around the at least one dental arch, calculating a size and shape of a toothbrush moulded piece having a facing surface configured to face the dental arch determined by the dental arch space and the bristle space, physically forming the moulded piece having a teeth region and a gingiva region, and covering the facing surface of the moulded piece with a bristle carpet, wherein the teeth region has two opposing teeth inner surfaces, the gingiva region has two opposing inner gingiva surfaces; and wherein a widest distance between the opposing teeth inner surfaces is less than a narrowest distance between the two opposing inner gingiva surfaces.

2. The method according to claim 1,
   wherein the toothbrush moulded piece is customized for each patient and the bristle carpet is non-customized with respect to bristle length, bristle thickness, bristle orientation and/or bristle base.

3. The method according to claim 1,
   wherein the dental arch space comprises an area of the patient's teeth and adjacent gingiva, and
   wherein the bristle space extends beyond the teeth towards the gingiva, labially, buccally and orally.

4. The method according to claim 3,
   wherein the bristle space extends beyond a region of the teeth and exclusively occlusally/incisally of the gingival region.

5. The method according to claim 1,
   wherein the bristle carpet comprises a bristle base in which bristles are anchored, and/or the bristle base and bristles of the bristle carpet are formed in a single piece, where the bristles are configured to face the dental arch when the mouthpiece toothbrush is in position in a patient.

6. The method according to claim 5,
   wherein the bristles of the bristle carpet extend through the bristle space and abut a tooth arch space, and project into the dental or tooth arch space by a predetermined amount in a range of 0.05 mm to 0.5 mm.

7. The method according to claim 1,
   wherein the bristle space has an equal or substantially equal thickness over a longitudinal extension of a surface thereof in a range of 1.5 mm to 4 mm, a range of 2 to 3 mm or at or about 2.5 mm.

8. The method according to claim 1, wherein the bristle carpet fills the bristle space and has a plurality of bristles which are mounted in the bristle base oriented perpendicularly or substantially perpendicularly to a tooth upper and/or lower surface.

9. The method according to claim 1, wherein the bristle carpet has a plurality of distributed bristles, the bristle carpet comprising a gingival portion extending obliquely to the facing surface facing the dental arch in the gingival direction, and an occlusal/incisal portion extending obliquely to the facing surface facing the dental arch in the occlusal/incisal direction.

10. The method according to claim 1, wherein the toothbrush moulded piece projects in the region of the gingival margin in the direction of teeth, forming an intensive cleaning region, and gingival margin bristles extend from the intensive cleaning region both in the direction of the teeth and in the direction of gingiva.

11. The method according to claim 1,
wherein the toothbrush moulded piece is produced by 3D printing and the bristle carpet is applied to an occlusal inner surface of the toothbrush moulded piece with a biocompatible adhesive.

12. The method according to claim 1,
wherein the bristle carpet is interchangeably mounted on or in the toothbrush moulded piece.

13. The method according to claim 1,
wherein the toothbrush moulded piece has the shape of a double T-beam in cross-sectional view and is configured for simultaneous application to the patient's upper jaw and lower jaw.

14. The method according to claim 1,
wherein at least one channel passes through the toothbrush moulded piece, with which the bristle carpet is placed under negative pressure in order to fix the bristle carpet by negative pressure.

15. The method according to claim 1, based on a plurality of mutually similar scan data, producing an individualized series of toothbrush moulded pieces followed by producing of series of mouthpiece toothbrushes using the toothbrush moulded pieces.

\*  \*  \*  \*  \*